United States Patent [19]

Chou

[11] Patent Number: 4,740,872

[45] Date of Patent: Apr. 26, 1988

[54] ILLUMINATING APPARATUS

[76] Inventor: An C. Chou, No. 12, Yuan St., Tai Nan City, Taiwan

[21] Appl. No.: 843,578

[22] Filed: Mar. 25, 1986

[51] Int. Cl.⁴ .............................................. F21L 7/00
[52] U.S. Cl. ................................... 362/183; 362/184; 362/387
[58] Field of Search ............... 362/183, 184, 190, 191, 362/157, 200, 258, 251, 387, 398, 20; 340/90

[56] References Cited

U.S. PATENT DOCUMENTS

| | | | |
|---|---|---|---|
| 2,668,228 | 2/1954 | Levinson et al. | 362/20 |
| 3,439,159 | 4/1969 | McRoskey et al. | 362/258 |
| 3,517,185 | 6/1970 | Moore et al. | 362/183 |
| 3,535,506 | 10/1970 | Moore et al. | 362/184 |
| 4,357,648 | 11/1982 | Nelson | 362/183 |
| 4,575,784 | 4/1986 | Dian | 362/191 |

Primary Examiner—Ira S. Lazarus
Assistant Examiner—D. M. Cox
Attorney, Agent, or Firm—Morton J. Rosenberg

[57] ABSTRACT

An illuminating apparatus comprising a lamp case, a battery socket at one side wall of the lamp case, the battery socket being provided a conducting plate at the innermost end thereof, a plug storage at the same side where the battery socket is provided, the plug storage being provided a plug socket conductively connected with the conducting plate of the battery socket, an incandescent lamp socket rigidly mounted on the bottom portion of the lamp case, a flash lamp socket rigidly mounted side by side with the incandescent lamp socket on the bottom portion of the lamp case, an incandescent lamp screwed within the incandescent lamp socket, a flash lamp screwed within the flash lamp socket, a wire collecting pulley loosely mounted on either of the incandescent lamp socket or the flash lamp socket, a wire check at the side wall of the lamp case in vicinity of the outermost end of the plug socket, a wire passage at the side wall where the wire check is provided, a multi-switch at the side wall where the wire check is provided, a battery received within the battery socket, and a conductive wire on the wire collecting pulley with one end connected to the multi-switch and the other end to a plug which is received within the plug storage.

4 Claims, 4 Drawing Sheets

ILLUMINATING APPARATUS

DETAILED DESCRIPTION OF PREFERRED EMBODIMENTS OF THIS INVENTION

Figure 1:
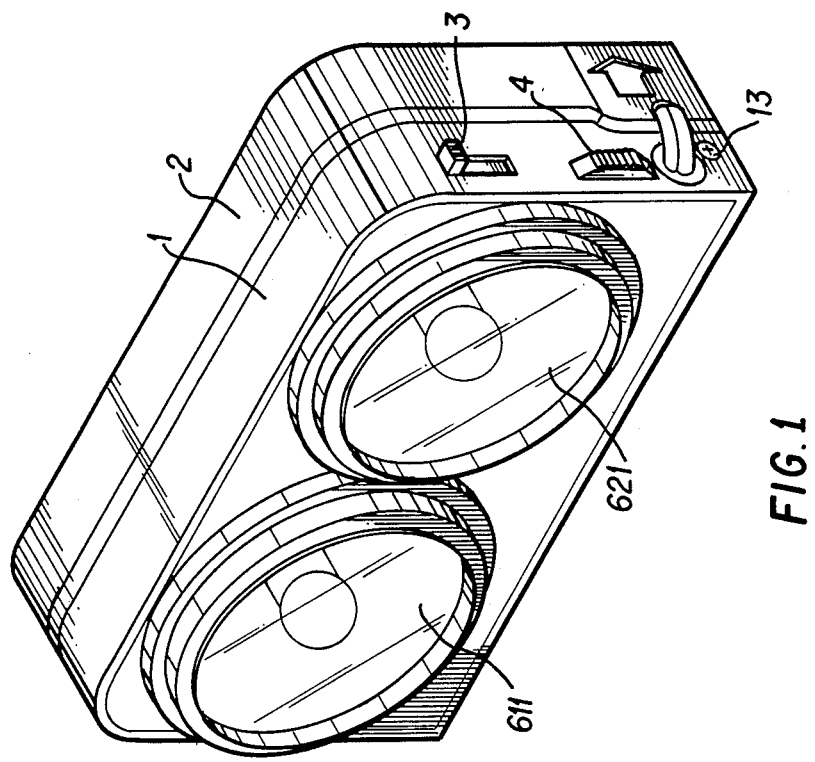
FIG. 1 is a perspective view of the illuminating apparatus in a closed position.
Figure 2:
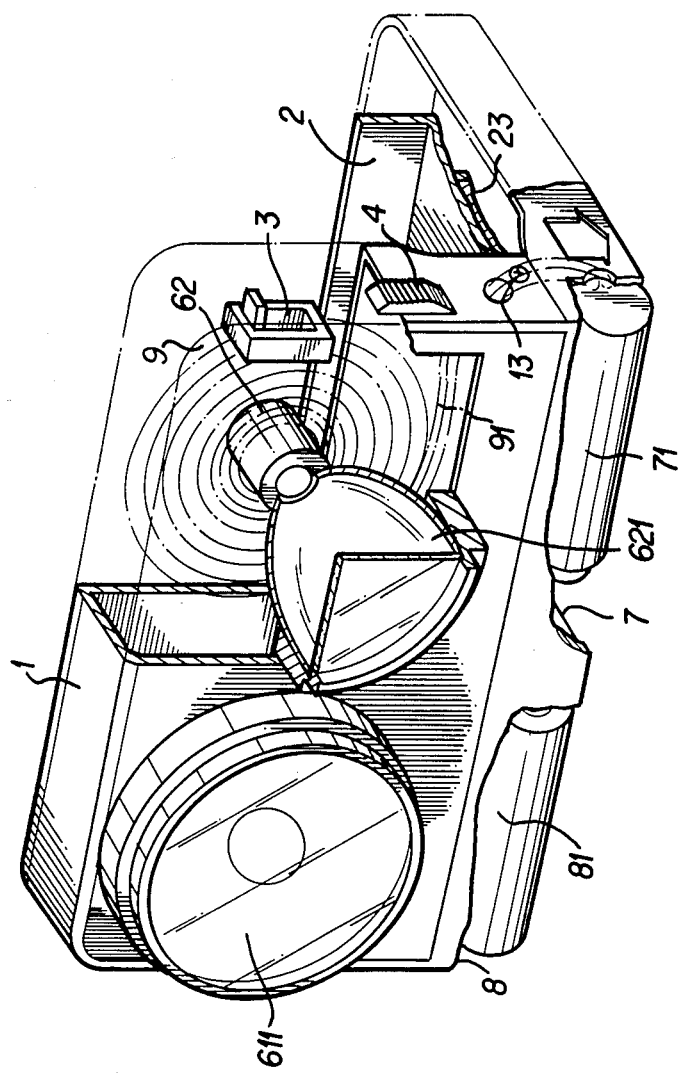
FIG. 2 is a perspective view partially cut away showing the illuminating apparatus with the supporting frame in an open position.

Referring now to FIGS. 1 and 2, there is shown illuminating apparatus 10, particularly directed to a hand illuminating system which may draw power from a contained battery or from an external power supply. FIGS. 1 and 2 show a preferred embodiment of illuminating apparatus 10 wherein there is provided supporting frame 2 mounted on lamp case 1 through hinge 13. As a result of the hinge connection between supporting frame 2 and lamp case 1, lamp case 1 may be rotated through an angle of 90° between supporting frame 2 and lamp case 1 when in use and as is shown in FIG. 2.

Secured to the bottom portion of supporting frame 2 is permanent magnet 23 to allow illuminating apparatus 10 to be removably coupled to a metal surface.

In this manner, lamp case 1 may be rotated internal to supporting frame 2 through rotation about hinge 13 and provide the user with a compact system which may be easily carried. Additionally, illuminating apparatus 10 may be releasably coupled to an external metallic surface through use of permanent magnet 23.

On the bottom portion of lamp case 1, there is provided a first incandescent lamp socket (not shown) to allow incandescent or first lamp 611 to be threadedly coupled therein in the standard fashion. Additionally, second or blinking lamp socket 62 is provided to allow second lamp 621 to be threadedly secured therein. As is shown in FIG. 2, first lamp socket and second lamp socket 62 are provided in side-by-side relation each to the other.

Pulley 9 is loosely mounted on flash lamp socket 62. Pulley 9 is merely a standard spring retractable pulley for reversibly allowing conductive wire 91 coiled thereon to be extended or retracted. Internal to pulley 9 is a standard return spring to allow conductive lead wire 91 to roll back upon pulley 9 upon retraction. Pulley or wire connecting pulley 9 is standard and may be of the type commercially available utilized on measuring tape systems.

Figure 3:
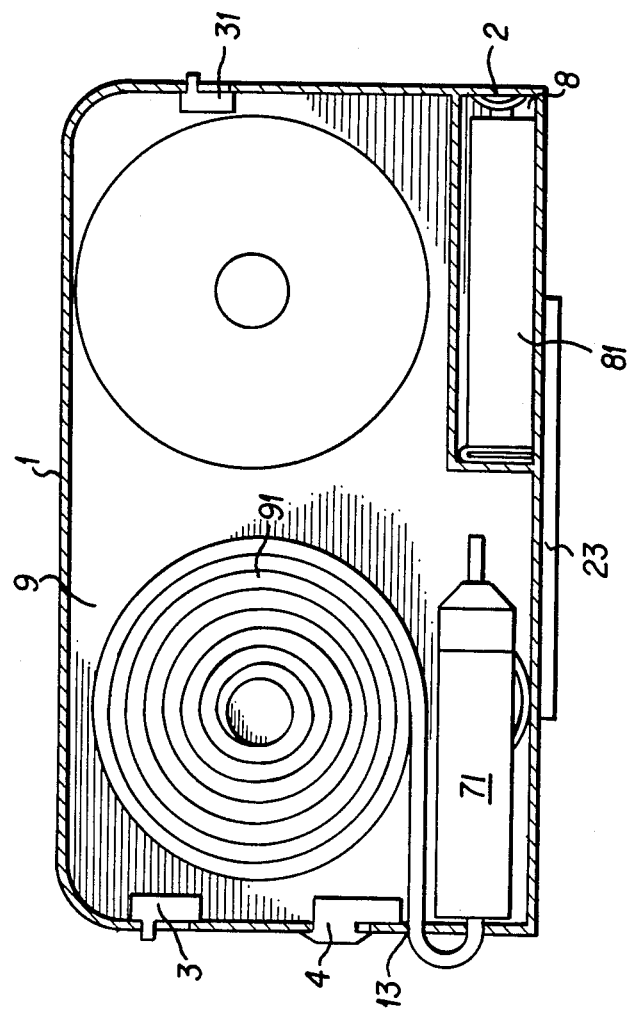
FIG. 3 is a rear view of the illuminating apparatus.

As shown in FIGS. 1, 2 and 3, wire collecting pulley 9 has rolled thereon conductive lead wire 91 which is an electrically conductive lead wire having one end connected to plug 71 and the opposing end of lead wire 91 being coupled to multi-pole switch 3 provided on the sidewall of lamp case 1. As will be explained in following paragraphs, multi-switch or multi-pole switch 3 is further coupled to power supply selecting switch 31 provided on the sidewall of lamp case 1.

As is more clearly seen in FIGS. 2 and 3, at the bottom edge of lamp case 1, there is provided standard battery 81 which may be a "C-cell" standard battery incorporated within battery socket compartment 8. In this manner, illuminating apparatus 10 may be portable in nature and utilize the power supply of battery member 81. When plug 71 is mounted within lamp case 1, it is in contact with an electrically conductive plate which is sandwiched between battery 81 and plug 71 to provide a current path as is described in FIG. 4.

Electrical coupling of battery 81 to first and second lamps 611 and 621 will be further described in following paragraphs relating to electrical diagram 4.

On the sidewall of lamp case 1, there is provided wire check number 4 to secure conductive wire 91 in fixed placement. Lead wire 91 passes through wire passage 13 as is shown in FIG. 3. Wire check member 4 may be moved into contact with lead wire 91 to provide frictional securement of lead wire 91 and maintain a fixed position thereof.

It is to be understood that supporting frame 2 of the preferred embodiment may be removed and in such a case, permanent magnet 23 may be fixed on the back side of the bottom portion of lamp case 1.

Figure 4:
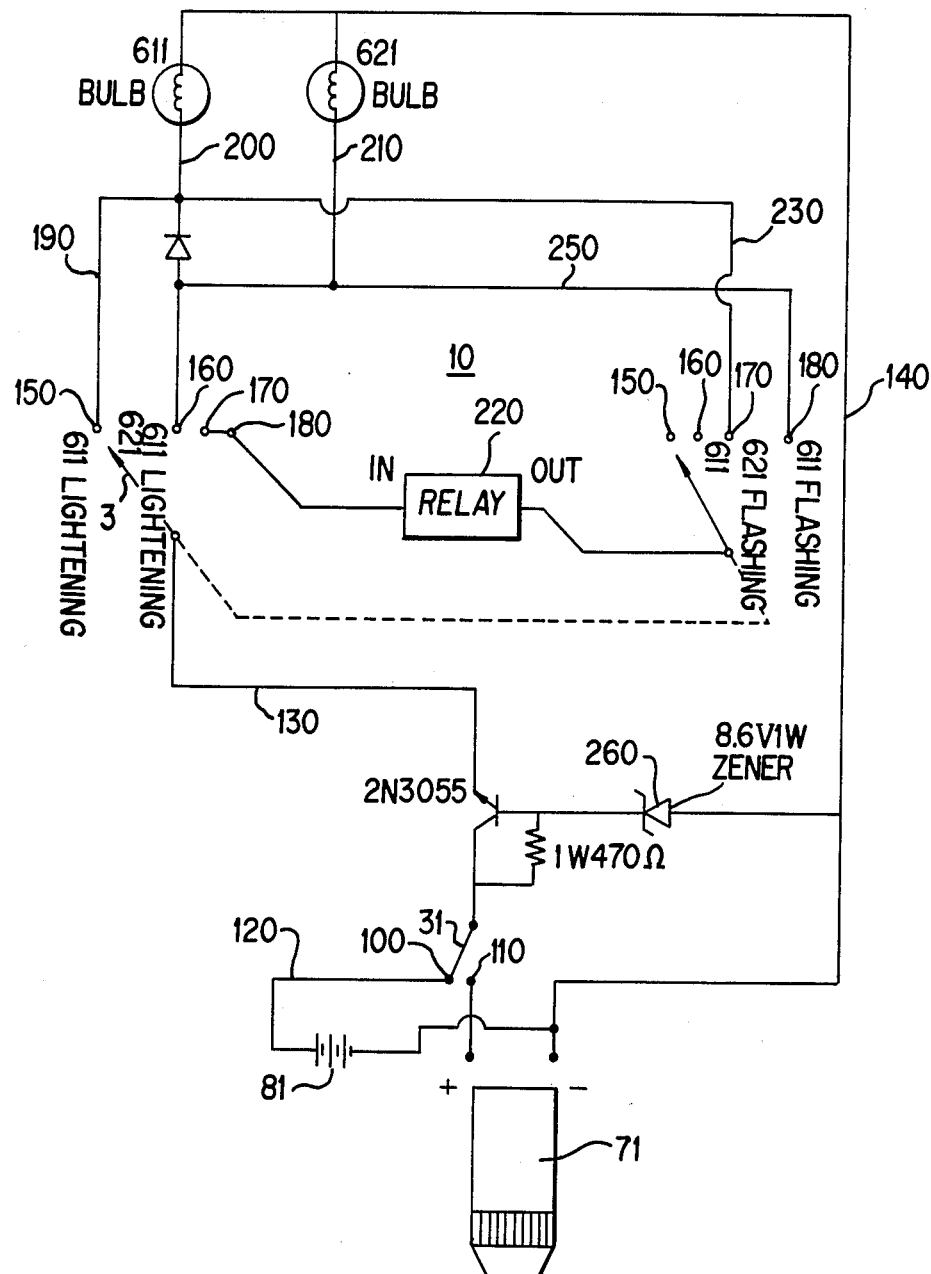
FIG. 4 is an electrical schematic diagram of the operational circuitry of the illuminating apparatus.

Referring now to FIG. 4, there is shown power supply selecting switch 31 which when coupled to terminal 100, allows electrical circuit completion from portable battery member 81. When power supply selecting switch 31 is coupled to terminal 110, power is supplied by the standard electrical system of a vehicle. When power selecting switch 31 is coupled to terminal 110, socket 71 may be inserted into a cigarette lighter or other vehicle electrical coupling system.

When power supply selecting switch 31 is in contact with terminal 100, electrical current passes through line 120, line 130, through multi-poled switch 3, through first and second bulbs 611 and 612, and returns on line 140.

When power supply selecting switch 31 is coupled to terminal 110, power is provided from the vehicle system through line 130, switch 3, bolts 611 and 621, and once again, returns on line 140.

Referring now to multi-poled switch 3, it is seen that when switch 3 is coupled to terminal 150, current passes through line 130, line 190, and through bulb 611 on line 200 and returns through line 140. In this manner, bulb 611 is maintained in a constant lighted condition.

When multi-poled switch 3 is coupled to terminals 160, it is clearly seen that electrical current passes through line 130 and into bulbs 611 and 621 through respective lines 200 and 210. In this manner, both bulbs 611 and 621 are maintained in a constant lighted condition.

When switch 3 is electrically coupled to terminals 170, electrical current passes through line 130, switch 3, and through standard relay 220 and through line 230 to provide intermittent power supply to bulb 611 and provide a blinking effect. Current then passes through return line 140 as has been previously described.

When switch 3 is electrically coupled to terminals 180, current flow passes through standard relay 220, and line 250 for passage through both bulb 611 and 621 to provide intermittent power supply and blinking of the combined bulbs 611 and 621. Zener diode 260 is coupled between return line 140 and line 130 to stabilize the voltage which allows adjustment of the voltage from the power supply to a suitable voltage for lamps 611 and 621 and as a result of which, plug 71 when coupled to the electrical system of a vehicle will not cause an overload voltage upon lamps 611 and 621.

It is to be noted that the above description is provided to explain and fully describe the inventive concept of the subject patent application, however, such does not limit the inventive concept.

What is claimed:

1. An illuminating apparatus comprising a lamp case, a battery socket compartment formed within a side wall of said lamp case for receiving a battery, said battery socket compartment having an electrically conducting plate at the innermost end thereof, a plug storage compartment, said plug storage compartment having a plug socket conductively connected with said conducting plate of said battery socket, a first lamp socket rigidly mounted on a portion of said lamp case, a second lamp socket rigidly mounted in the vicinity of said first lamp socket on the bottom portion of said lamp case, a first lamp threadedly secured within said first lamp socket, a second lamp threadedly secured within said second lamp socket, an electrical lead wire collecting pulley rotatively mounted on said first lamp socket or said second lamp socket, a wire check member at one side wall of said lamp case for releasably securing electrical lead wire mounted on said wire collecting pulley, a multipole switch at the side wall of said lamp case, a power supply selecting switch on the side wall of said lamp case, said conductive electrical lead wire being rolled on said wire collecting pulley with one end connected to said multi-pole switch and the other end to a plug which is received within said plug storage compartment, said multi-pole switch being further connected to said power supply selecting switch.

2. An illuminating apparatus according to claim 1 further comprising a permanent magnet fixed onto the bottom portion of said lamp case.

3. An illuminating apparatus according to claim 1 further comprising a supporting frame mounted on said lamp case by a hinge.

4. An illuminating apparatus according to claim 3 further comprising a magnet fixed onto the bottom portion of said supporting frame.

* * * * *